United States Patent [19]

Barron et al.

[11] Patent Number: 6,030,575
[45] Date of Patent: Feb. 29, 2000

[54] METHOD FOR MAKING PREFORMS

[75] Inventors: James H. Barron, Brazoria; James Entringer, Angleton; Randy S. Moore, Lake Jackson, all of Tex.

[73] Assignee: The Dow Chemical Company, Midland, Mich.

[21] Appl. No.: 08/754,608

[22] Filed: Nov. 20, 1996

Related U.S. Application Data

[63] Continuation-in-part of application No. 08/271,532, Jul. 7, 1994, abandoned, which is a continuation of application No. 07/781,051, Oct. 21, 1991, abandoned.

[51] Int. Cl.$^7$ .............................. B27N 3/04; B29C 70/12; D04H 1/60
[52] U.S. Cl. ......................... 264/517; 264/121; 264/126; 264/128; 264/136
[58] Field of Search ................................. 156/62.2, 62.8, 156/82, 283, 285, 296, 309.9, 309.6, 322; 264/112, 113, 121, 128, 136, 517, 518, 126; 425/80.1, 82.1, 83.1; 427/180, 195

[56] References Cited

U.S. PATENT DOCUMENTS

| | | | |
|---|---|---|---|
| 2,702,261 | 2/1955 | Bacon et al. ............................ | 154/101 |
| 2,961,361 | 11/1960 | Dennis ................................... | 154/101 |
| 3,028,282 | 4/1962 | Schuller et al. ......................... | 154/43 |
| 3,170,197 | 2/1965 | Brenner ................................. | 19/148 |
| 3,177,275 | 4/1965 | Brenner ................................. | 264/128 |
| 4,104,340 | 8/1978 | Ward ..................................... | 264/6 |
| 4,869,950 | 9/1989 | Elsen et al. ............................. | 428/198 |
| 4,992,228 | 2/1991 | Heck et al. ............................. | 264/135 |
| 5,217,672 | 6/1993 | Kelman et al. ......................... | 264/517 |
| 5,427,725 | 6/1995 | White et al. ............................ | 264/137 |
| 5,427,726 | 6/1995 | White et al. ............................ | 264/137 |

FOREIGN PATENT DOCUMENTS

| | | |
|---|---|---|
| 80310 A1 | 1/1983 | European Pat. Off. . |
| 54-043262 | 4/1979 | Japan . |
| 35917 | 2/1984 | Japan . |
| 60-082344 | 5/1985 | Japan . |
| 61-160464 | 7/1986 | Japan . |
| 91-052806 | 2/1989 | Japan . |
| 791976 | 3/1958 | United Kingdom . |
| 1248060 | 9/1971 | United Kingdom . |
| WO 93/08322 | 4/1993 | WIPO . |
| 93/20994 | 10/1993 | WIPO . |

OTHER PUBLICATIONS

Modern Plastics, pp. 48, 49, 51, Dec. 1993.
Goldsworthy, Hand and Machine Preforming, Society of the Plastics Industry, Inc., Sec 5B pp. 1–4, 7–9, 1952.
Dean, Methods of Mass Production, Chapter VIII, pp. 105–108, no date.
International Search Report dated Jan. 15, 1993 issued by the EPO acting as the International Searching Authority in PCT US92/08947.
R. H. Sonneborn, "Fiberglass Reinforced Plastics", pp. 48–61, (1954).
E. P. Carley et al., "Preforming for Liquid Composite Molding", *44$^{th}$ Annual Conference and Focus '89 Proceedings*, Feb. 6–9, (1989).
M. Jander, "Industrial RTM New Developments in Molding and Performing Technologies", *Technical Paper From Owen–Corning Fiberglass*, pp. 28–33, (1991).
A. W. Levenhagen, "Automatic Preforming", *Society of Plastics Industry*, Section 5A, pp. 1–2(1952).

*Primary Examiner*—Steven D. Maki

[57] ABSTRACT

An improvement in the preparation of fiber preforms in which binder and fibers are dispersed to contact on vacuum-supplied screens is disclosed, comprising particularly (a) selecting a particulate binder material which is solid at 25° C; (b) heating the binder material, during initial contact with the fibers, to a viscosity and for a time which is the same as or proportional to 1,000 centipoise for one second; and (c) dispersing the binder material and the fibers such that the preform exhibits a variation in the ratio of fibers and binder which correlates to a coefficient of variation which is less than or equal to about 5 percent. The resulting preform shows superior compaction and uniformity of constitution even when it is prepared in sections or in asymmetric configurations. A wide variety of binders can be used, including thermoplastic and thermoset polymers, glasses, ceramics, metals, and the like, and the binder can also be selected from multi-component systems which are reactive with one another, such as epoxy-based systems, and/or reactive with a resin impregnant which may be subsequently introduced. In an alternative embodiment the preforms can be heated and pressed to make final composite articles, with or without direct application of a molding resin.

9 Claims, No Drawings

METHOD FOR MAKING PREFORMS

CROSS-REFERENCE TO RELATED APPLICATION

This application is a continuation-in-part of application Ser. No. 08/271,532, filed Jul. 7, 1994, now abandoned, which is a continuation of application Ser. No. 07/781,051 filed Oct. 21, 1991, now abandoned.

BACKGROUND OF THE INVENTION

This invention relates to a method of making a preform suitable for use in making composite articles.

There is an increasing need for high strength polymeric materials to replace metals in many applications. The polymeric materials have the advantage of lower weight and are often less expensive and more durable than metals. Usually, however, the polymeric material is much lower in strength than the metal, and unless it is reinforced in some manner it will not meet the strength requirements for metal replacement.

Thus, polymeric composites have been developed to meet these strength requirements. These composites are characterized by having a continuous polymeric matrix in which is embedded a reinforcement material, usually a relatively rigid, high aspect ratio material such as glass fibers.

These composites usually are molded into a predetermined shape, which is in many cases asymmetric. In order to get the reinforcement material into the composite, the reinforcement material is usually placed into the mold in a first step, followed by closing the mold and then introducing a fluid molding resin. The molding resin fills the mold, including the interstices between the fibers, and hardens (by cooling or curing) to form the desired composite. At other times, the molding resin is applied to the reinforcing fiber prior to molding. The fiber with resin is placed into a mold where temperature and pressure are applied, curing the resin to prepare the desired composite.

It is highly advantageous that the reinforcement material is uniformly distributed throughout the composite, or else the composite will have weak spots where the reinforcement is lacking. Thus, the reinforcement material is desirably prepared to ensure that the individual fibers are distributed evenly throughout the composite. In addition, the individual fibers desirably resist flowing with the molding resin as it enters the mold.

For these reasons, it is conventional for the reinforcement to be formed into a mat outside of the mold, and the preformed mat is then placed in the mold and either impregnated with resin in order to make the final composite article, or simply heated and pressed to make a very low density composite article. The mat is generally prepared by forming the reinforcing fibers into a shape matching the inside of the mold and applying a binder to the fibers. In some instances a thermosetting binder is pre-applied, and then cured after the fibers are shaped into a mat. In other methods, a thermoplastic binder is applied, so that in a subsequent operation the binder can be heated and softened and the mat subsequently shaped. This binder "glues" the individual fibers to each other so that the resulting mat retains its shape when it is transferred to the mold for further processing. The binder also helps the individual fibers retain their positions when the fluid molding resin is introduced into the mold. In some cases, a molding resin can alternatively be applied to the reinforcing fiber prior to molding. The fiber with binder and resin is placed into a mold where temperature and pressure are then applied, curing the resin to prepare the desired composite.

The binders used heretofore have been primarily of three types. Unfortunately, the conventional use of each of these types of binders has significant drawbacks. The predominantly used binders have been solvent-borne polymers, i.e., liquids, such as epoxy and polyester resins. The solvent-borne binders are usually sprayed onto the mat via an "air-directed" method, and then the mat is heated to volatilize the solvent and, if necessary, cure the binder. This means that the application of binder is at least a two-step process, which is not desirable from an economic standpoint, and also that the use of solvents is encountered, which raises environmental, exposure and recovery issues. Dealing with these issues potentially adds significantly to the expense of the process. The procedure is also energy-intensive, as the entire mat must be heated just to flash off solvent and cure the binder. The curing step also makes the process take longer. Finally, use of these binders is also extremely messy, with high maintenance costs associated with keeping the work area and the screen itself clean. In this case, where the binder may be a low viscosity fluid, it tends to flow over and coat a large portion of the surface of the fibers. When a composite article is then prepared from a preform made in this way, the binder often interferes with the adhesion between the fibers and the continuous polymer phase, to the detriment of the physical properties of the final composite.

Powdered binders have also been used. These can be mixed with the fibers and then the mass formed into a preform shape, which is then heated to cure the binder in situ. Alternatively, these binders can be sprayed to contact the fibers, but simple substitution of a powdered binder in this air-directed method raises its own problems. The powdered binders cannot be applied unless a veil is first applied to the screen to prevent the binder particles from being sucked through. Again, this adds to the overall cost and adds a step to the process. Airborne powders also present a health and explosion hazard. Finally, the use of powdered binders also requires a heating step to melt the binder particles after they are applied to the fibers, which renders this process energy-intensive as well.

A third type is heated thermoplastic materials, which can be melted and sprayed as a binder. Use of these materials makes any subsequent heating step unnecessary, since the binder does not require it to achieve some undetermined measure of adhesion to the fibers. However, in this method, "lofting", or inadequate compaction of the preform, typically occurs, because the thermoplastics are conventionally heated to any random temperature above their melting points, leading to a lack of uniformity in their cooling patterns and extensive migration along fiber surfaces, which in turn allows some of the fibers to "bounce back" before they are set into place by the solidifying thermoplastic. This may result in formation of a lower density preform than desired, density gradients throughout the preform, and poor adhesion of the fibers to each other.

In view of the problems discussed hereinabove, it would be desirable to provide a simpler method for making preforms in which the problems associated with using solvent-borne, powdered or thermoplastic binders are minimized or overcome.

SUMMARY OF THE INVENTION

The present invention provides, in a method for making a fiber preform, suitable for use in preparing a composite article, wherein reinforcing fibers are dispersed onto a foraminous screen to form a shaped mat, and wherein the fibers are maintained in position on the screen by use of a vacuum means interposed behind the screen, and wherein a binder material is concurrently dispersed such that the binder material contacts the fibers, and wherein the binder is then allowed or enabled to cool while in contact with the fibers, an improvement comprising (a) selecting a particulate binder material which is solid at 25° C.; (b) heating the binder material during initial contact with the fibers to a temperature such that its viscosity is reduced to a predetermined minimum level of less than about 1,000 centipoise and then returned to its solid state within about one second, or a proportional ratio of viscosity and time thereof; and (c) dispersing the reinforcing fibers and the binder onto the screen under conditions such that a compacted, uniform fiber preform is prepared, wherein the dispersal is accomplished under conditions such that the variation of ratio of fibers and binder throughout the fiber preform exhibits an average coefficient of variation which is less than or equal to about 5 percent.

In another aspect, the present invention is a method for making a fiber preform, suitable for use in preparing a composite article, comprising the steps of (a) spraying fibers onto a foraminous screen; (b) maintaining the fibers in position on the screen by use of a vacuum means positioned behind the screen; (c) concurrently with step (a), spraying a particulate binder material such that the binder material contacts the fibers to bind them together and form a compacted, uniform fiber preform; (i) wherein the binder material is solid at 25° C.; and (ii) wherein the binder material is heated during initial contact with the fibers to a temperature such that its viscosity is reduced to a predetermined minimum level of less than about 1,000 centipoise and then returned to its solid state within about one second, or a proportional ratio of viscosity and time thereof; and (iii) wherein the spraying of the reinforcing fibers and the binder material is carried out under conditions such that the variation of ratio of fibers and binder throughout the fiber preform exhibit an average coefficient of variation which is less than or equal to about 5 percent.

The invention thus provides for a simplified, effective method for making preforms which can then be impregnated with resin or simply subjected to heat and pressure to form final composite articles of essentially any size or configuration. Because the binder material is a "true" solid or supercooled liquid at 25° C., volatile organics such as solvents are not present in significant amounts, and the problems associated with them are avoided. The preform does not require a post-heating step to remove solvent or cure the binder, and so a process step is saved and energy requirements are reduced. In addition, because of the combination of vacuum and carefully controlled binder viscosity for a specified length of time, compaction of the preform is achieved, which means that the potential increase in fiber loadings offers strength improvements in the final composite article. This also reduces the surface area of the fibers which is covered with binder, which avoids adhesion problems between the resin and the fibers in the composite article. Finally, control of the dispersion of the binder and fibers, through control of the design and arrangement of the spray nozzles or other emission means, within the limits of the coefficient of variation ensures a uniformity of constitution in the preform and, consequently, in the resin composite article, which enables preparation in sections or in asymmetric shapes and maximizes uniformity of physical properties in the preform and in the composite article.

DESCRIPTION OF THE PREFERRED EMBODIMENTS

As discussed hereinabove, a particulate binder material which is solid at 25° C., i.e., approximately ambient temperature, is applied concurrently with reinforcing fibers to form a preform on the surface of a foraminous screen. As used herein, the term "preform" thus refers to a collection of intersecting fibers to which a binder has been applied. The preform may or may not be shaped to a particular configuration for making a particular molded composite. The term "mat", in contrast, refers to a collection of intersecting fibers exclusive of any binder which may or may not be present.

A first important key to the present invention is the selection of binder. The binder must be solid at 25° C., with the term "solid" as used herein including true solids as well as supercooled materials such as glass. Similarly, the terms "melt" or "molten" are used broadly herein to describe true melting as well as the heating of a supercooled liquid to a fluid state. The binder must be capable of melting so that it can be applied to the fibers without significant decomposition. Further, the binder must be such that it adheres to the fibers of the mat upon cooling, forming a preform capable of maintaining its integrity and, particularly in the case of asymmetric preforms, its shape during further handling. It is also preferably of a composition such that it does not significantly degrade under the temperature conditions which are encountered during the preform preparation or subsequent composite molding operations.

Accordingly, the binder can be selected from a wide variety of compositions. Non-cellular and cellular polymers which melt or soften without substantial decomposition are particularly useful. Ceramic materials such as glass can also be used, as well as metals, especially low-melting metals. The selection of the composition of the binder to the binder will depend to an extent on the characteristics which are desired in the preform, as described hereinbelow.

It is generally preferred to select an organic polymer as the binder material. A wide variety of organic polymers can be used, provided they meet the requirements set out above. Those having a melting point ("Tg") from about 40, preferably from about 45, to about 220, preferably to about 180, more preferably to about 100° C., are of particular interest. Thermoplastic polymers are preferred, because those polymers melt easily without significant decomposition and solidify to adhere to the fibers. Among the thermoplastic resins particularly useful herein are vinyl polymers and copolymers, including homopolymers and interpolymers of ethylene, propylene, styrene and the like; conjugated dienes such as butadiene; acrylics such as alkyl acrylates, acrylamide, acrylonitrile, alkyl methacrylates, hydroxyalkylacrylates and methacrylates; vinyl halides such as vinyl chloride, vinylidene halides such as vinylidene chloride, and the like; mixtures thereof; and the like. Other types of thermoplastic polymers, including polyamides, polyesters, polycarbonates, thermoplastic polyurethanes, linear epoxy resins, and the like are also useful. A preferred organic polymer is an epoxy resin, particularly a substantially linear solid epoxy resin, especially a diglycidyl ether of a bisphenol. Suitable such epoxy resins include those described in U.S. Pat. No. 4,992,228, incorporated herein by reference. Preferably the polymeric binders are non-cellular, but cellular polymers as well as expandable polymers can also be used. In order to optimize adhesion of the molding resin to the preform when the composite article is prepared, it is desirable to use a binder material which is compatible or otherwise complementary with the molding resin.

As noted, alternative materials such as glass and other ceramic materials, metals (particularly low melting metals and alloys), waxes and the like can be used as the binder. Metal binders are of particular interest when it is desired to prepare a conductive preform. The ceramics and metals preferably have a melting point of less than about 700° C., preferably from about 100 to about 500° C. This melting point range is preferred because at these temperatures the particles are melted easily and quickly cool to resume a solid state.

It is strongly preferred that the selected binder contains no more than a small amount of volatile organic materials. This obviates a drying step after application, and avoids the environmental and health risks associated with the presence of volatile organics. A volatile organics content of 5 percent or less, preferably 2 percent or less, is thus desired. In particular, it is preferred that, where an organic polymer is selected, it is substantially free of solvent and most preferred that an essentially 100 percent solids organic polymer be used.

Another key of the present invention is that the binder is in the form of a particulate. The term "particulate" is used herein to refer not only to generally solid, low aspect ratio (about 3 or less) particles, but also to short fibers, hollow structures such as glass microbubbles or polymer foam particles, and the like. The size of the particles is not especially critical, although their particle size as well as their particular composition do affect melting rate, which in turn affects the amount of heating needed. For low aspect ratio materials, particles of 10 to 250 mesh are generally preferred, with those of about 50 to 100 mesh being particularly useful. For high aspect ratio (greater than 3) binders, diameters of from about 1, preferably from about 10, to about 500, more preferably to about 100, more preferably to about 30 microns are generally advantageous.

In addition to selecting a binder material, or mixture thereof, the process of the present invention requires selection of a fiber material which forms the fiber mat. The selected fiber material preferably consists of "chopped", relatively short, fibers which are essentially randomly oriented in the mat and therefore in the preform, although continuous unchopped fibers can also be employed. The chopped fibers preferably exhibit an aspect ratio of at least about 5, preferably at least about 10, and a length of at least about 0.1 inch, preferably at least about 0.25 inch. The fibers preferably have an average length of up to about 18 inches, preferably up to about 10 inches, more preferably up to about 4 inches. Fiber diameters in the range from about 1 to about 1000 microns are generally preferred. The fibers may be monofilament, multistrand, woven or nonwoven. Fiber rovings are also useful. The fibers can be of varying composition, provided that they do not melt as a composite is made therewith, and in general are chosen so that the fibers are stiffer (have a higher flexural modulus) than the molding resin which may be used in preparing the composite article. Thus, high flexural modulus organic polymers such as polyamides, polyimides, aramids and the like; metals, glass and other ceramics; carbon fibers; graphite fibers; mixtures thereof; and the like, are particularly suitable fiber materials. Glass fibers, including E glass and S glass, are preferred in many instances because of cost, availability and excellent reinforcing properties.

Once the binder and fiber materials have been selected, it is necessary to effectively contact them together to form the preform. In the conventional "air-directed" method, chopped fibers are sprayed or blown onto a foraminous screen. The screen may be conveniently shaped to match the contours of the mold which will later be used for final composite article preparation. Air is drawn through the screen by means of a vacuum which is disposed behind the screen, i.e., on the side opposite to that to which the fibers and binder will be applied. This vacuum serves to position and hold the fibers in place while they are being contacted with the binder. This process is described more fully by Carley et al., "Preforming for Liquid Composite Molding", 44th Annual Conference, Composites Institute, The Society of the Plastics Industry, Inc. (Feb. 6–9, 1989), incorporated herein by reference.

In contacting the binder and fiber materials, it should be noted that the dimensions and configuration of the preform are not particularly critical provided that sufficient binder and fibers can be applied to produce a preform which has sufficient mechanical integrity to enable its transfer to a mold for subsequent processing. Preform thicknesses of up to about 1 inch, preferably up to about 0.5 inch, more preferably 0.125 to 0.4 inch, are typically suitable. Of course, the preferred thickness will depend on the particular composite article intended to be made therewith. Preform weights of about 0.1 to about 10 kg/m$^2$ can be prepared in this method, with weights from about 0.5 to about 6 kg/M$^2$ being typical. It is a particular advantage of the present invention that higher density preforms (4–10 kg/M$^2$) can be prepared easily.

To use an "air-directed" method of application, which deposits the binder and fiber materials more or less concurrently and randomly on the foraminous screen, it is necessary to initially apply sufficient heat to the binder to at least partially melt it (the distinction between being "molten" and "at least partially molten" being of no significance herein just prior to contact with the fibers), prior to its contact with the fibers. In a preferred embodiment of the present invention, the binder particles are sprayed toward the screen through a heat source interposed between a nozzle or similar device used to emit the binder particles and the screen. The preferred heat source is a flame, but other heat sources such as microwave or infrared radiation, a convection oven, hot air or other hot gas, can also be used. Most preferably, a flame spray apparatus, such as that sold under the trade name "Uni-Spray-Jet" by UTP Welding Materials, Inc., is used to propel the solid binder particles through a flame and then into contact with the fibers.

In another method, a bulk binder material is exposed to a heat source such as a flame such that a portion thereof melts. A gas stream is then blown across the molten binder, causing particles of the molten material to be borne from the heat source into contact with the fibers. This process is particularly useful for higher melting binder materials, such as glass or metals, although it can be used with polymeric binders as well. This process has the advantage of using a binder in bulk form, thus eliminating the need for a pre-comminuted starting material. However, it should be noted that these "droplets" of molten material are still included within the meaning of "particulate binder material".

Regardless of the selected method of heating of the binder, it is necessary that sufficient binder is applied to adhere the fibers to form a preform which can maintain its physical integrity during any subsequent handling and molding operations. It is preferable that from about 0.25, more preferably from about 1, and most preferably from about 2, to about 100, more preferably to about 20, most preferably to about 10 parts, by weight of binder are used per 100 parts by weight mat.

It is a particular advantage of the present invention that any of described heating methods can be used to maximize the compaction of the preform by carefully controlling the viscosity of the binder material. While conventional methods looked to the properties of the solid or cured binder after incorporation in the preform, and/or to its pre-use characteristics (solvent-borne, powdered, etc.), the present invention includes as a key feature a predetermination of the viscosity of the binder upon and during its contact with the fibers during processing, which enables selection of a binder and heating conditions which will together allow for the improved compaction which is so important to the properties of the final preform.

Specifically, it has been surprisingly determined that these improvements can be obtained when the binder material is heated and then cooled, or allowed to cool, such that, beginning with initial contact of the binder with the fibers, the binder's viscosity is reduced to a predetermined minimum level and then returned to its maximum (solid) level within a correlated time period. In the present invention, this minimum viscosity level is defined to be either less than about 1,000 centipoise, when the total heating/cooling time is about 1 second, or a proportional ratio of viscosity and time thereof. This viscosity/time relationship can be termed the "melt flow history" of the process, and means that the heating/cooling curve which can be plotted using these two variables is predetermined to ensure that the binder has a certain "flowability" to optimally adhere the fibers without unnecessary additional migration along the fiber surface, after which the binder is cooled or allowed to cool sufficiently quickly to set the fibers into place. This results in significant improvement in compaction, which is provided by a combination of the force of the vacuum means behind the screen and the force of the spraying of the binder and fibers, because the fibers do not have the opportunity to significantly "bounce back" when the spray force and/or vacuum are removed from the given area.

Thus, those skilled in the art will recognize that this aspect of the present invention provides a simplified means of predetermining "flowability", since viscosity by its terms [g/cm-sec] is essentially a definition of flowability. For practical purposes, the skilled routineer can select a binder; predetermine the temperature and time which meets the criteria given (less than about 1,000 centipoise and 1 second, or proportional thereto) for that particular binder, based upon its known or easily-determined viscosity profile; and then design apparatus and/or processing conditions as appropriate, to ensure that the temperature at or very closely proximate to the screen is "ramped up" to achieve that maximum temperature (and therefore minimum viscosity) and then "ramped down" to return to ambient (25° C.), at which the binder has resolidified, within the specified time.

For example, where the binder selected is known or determined to have a viscosity at a temperature of, for example, 200° C., of less than 1,000 centipoise, it is necessary to heat from ambient or approximately ambient to about 200° C., beginning at approximately the time of contact between the binder and the fibers (which is expected to occur at or closely proximate to the screen itself), and then return, or allow return of, the temperature such that the binder again reaches a solid state, within about 1 second. Since the present invention also specifies that a "proportional ratio" can also be employed, the same binder could be heated to a lesser temperature, at which its increased viscosity would be known. However, in this case the time would also need to be proportionately increased in order to achieve comparable compaction. For example, if a binder has a viscosity of 2,000 centipoise at the lower temperature, then the desired time to ramp it to this temperature and allow its return to a solid state would be about 2 seconds. Significantly shorter heating would be expected to increase "lofting", i.e., reduce compaction, of the final preform if prepared under otherwise identical conditions (vacuum, spray force, etc.).

Ramping of the temperature for the required amount of time can be done via various means. Obviously, this becomes more of an issue where the practitioner selects a binder and/or temperature where viscosity is relatively high and therefore the time is relatively long. The cooling effect of the vacuum must also be taken into account. Thus, direction of the heat from a flame, hot air or gas source, microwave, or other energy source to heat the fibers and binder on the surface for the required length of time and from a predetermined distance is particularly effective. Moreover, where robotic application of fibers and binder is carried out, the robot can be programmed to deliver the heat in correct amount for the correct time.

As already noted hereinabove, in the present invention it is desirable to begin the binder melting process shortly before the fibers and binder particles contact each other, since this assures some level of immediate adhesion. This can be advantageously accomplished by ensuring that the binder passes into an area of increased temperature, for example, by passing briefly through a flame, prior to reaching the screen and contacting the fibers. Thus, while the binder in this instance is not starting its temperature ramp literally from ambient, it is generally still extremely viscous when it contacts the fibers. Therefore, any very small amount of time (usually a small fraction of a second) required for the binder to then reach the heating area at the screen, where the slope of the temperature ramp would increase very rapidly, would not be included within the viscosity/time limitations of this invention because it would not be expect that the binder would exhibit any significant "flowability" at this point, but rather that it would be essentially "tacky". (See, for example, Comparative Example 2 hereinbelow.) Similarly, cooling that may occur between a temperature of resolidification and actual ambient temperature is also not included in the viscosity/time limitations of this invention. Speaking pictorially, the present invention is concerned with temperature control, as plotted against time, to assure a relatively sharp-peaked curve with steep mathematical slope values on each side of the peak. Particular consideration of the starting and finishing portions of the curve, during which the binder is solid or of such high viscosity that it is effectively solid, and where the curve exhibits greatly reduced slopes, is not a focus of this invention.

Once the binder particles and fibers have been in contact under the controlled heat conditions as described above, the binder has reached effective resolidification. The fibers themselves tend in many cases to act as a heat sink, quickly removing heat from the binder particles. As noted above, the air flow through the preform and originally particulate nature of the binder material, assuring limited distribution of the binder even while molten, also contributes to rapid cooling. Because this cooling often therefore occurs almost instantaneously simply via removal of the heat source from a given application area, the preform is ready for subsequent handling and use almost immediately. If necessary, additional cooling means can be implemented.

Another important aspect of the present invention is that it enables predetermination of the rate of application of the binder and fibers to the preform, or the area thereof which is being prepared, in order to ensure an improvement in the uniformity of constitution and therefore in the properties of both the preform and of the composite article to be molded therefrom. Heretofore it has been difficult to prepare preforms which are large and require preparation in sections, or which are very asymmetric, because these features almost invariably resulted in unequal dispersion of resin and fibers. The present invention solves this problem through the use of predetermined design and arrangement of the binder and fiber spray nozzles, or other emission means, to ensure that the variation in the ratio of fiber and binder throughout the preform exhibit an average coefficient of variation which is less than or equal to about 5 percent. Coefficient of variation is calculated as the standard deviation divided by the average ratio value. In order to achieve this improvement in uniformity in the present invention, it has been found to be advantageous to individually meter the throughput rates of the fiber and binder components on a time basis. Again, this is particularly well-suited to robotic preparation of preforms, since the speed of the robot(s) and pattern of delivery can be set to meet the calculated coefficient of variation limitations, and the relationship of the nozzles and the screen to one another can be easily designed by those skilled in the art to ensure corresponding and desirable arrival of the binder and fibers at the screen, given the throughput rates and distance (s) of the nozzles from the screen.

One interesting advantage of the process of the present invention is that it permits the use of a much wider variety of binders than previous processes. It can be advantageously employed with noncellular polymeric binders, thus providing a faster and more economical method of making a preform. In addition, this process permits the use of materials which previously were not considered for use as binders. Glass and metals, for example, can be used, thereby eliminating any organic polymer from the preform. The use of metals permits the preparation of conductive preforms. Foamed polymer particles or expandable thermoplastic beads can also be used as the binder. This permits the preparation of a preform bound with a large amount of a low density material, which preform can than be used to make a composite having a reduced internal density, as is desired in forming lightweight structural parts.

In another embodiment, a non-melting filler material may be sprayed to contact the fibers simultaneously with the binder material. It can also be applied in an intermediate step such that the resulting preform has a "core" rich in such non-melting filler material sandwiched between outer binder layers. Such fillers include thermosetting polymers, inorganic fillers such as titanium dioxide, kaolin, wollastonite, mica, calcium carbonate, aluminum trihydrate, mixtures thereof, and the like. The organic polymer filler can be of several types, with recycled polyurethane scrap being particularly advantageous in certain applications. By applying a filler in this manner, the filler can be applied evenly to the fibers and bound to them by the binder material, thus reducing or eliminating altogether the problem of the filler particles falling out of the preform during handling, or being washed out when the resin is injected during composite formation. Use of such fillers can be in a single stream with the fibers or with the binder or via an independent, preferably metered third stream.

Other modifications to the preform can be made as necessary. For example, spot reinforcement, such as, for example, with woven or non-woven support materials, can be incorporated into the preform prior to or after the application of the binder, in order to provide areas of extra reinforcement. The portions of spot reinforcement can be fixed in place onto the preform by the simple addition of heat for a few seconds to bond the spot reinforcement to the preform. Directionally oriented reinforcing fibers can also be used for additional strength and reinforcement.

The resulting preform is ultimately useful in preparing molded composite articles. These processes generally involve shaping the preform to match the contours of a mold (if such is not already done as the preform is made), placing the shaped preform into a mold, injecting an uncured or melted molding resin into the mold, and then curing or cooling the molding resin as needed to form a solid molded polymer. Of particular interest are the resin transfer molding ("RTM") and structural reaction injection molding ("SRIM") processes. Such processes are described, for example, by Vaccarella, "RTM: A Proven Molding Process", section 24-A, *Proceedings of the 28th Annual Conference*, Society of the Plastics Industry, 1985, p. 1–8, and in U.S. Pat. Nos. 4,810,444 and 4,863,994, incorporated herein by reference. Although thermoplastic polymers can be used as the resin for these applications, they usually have viscosities that are too high for easy processing, i.e., they require substantially lengthened heating times and/or substantially increased heating temperatures. The high viscosity of the thermoplastic polymers often causes them to flow very poorly around the fibers in the preform, causing the formation of void spaces or in some instances destruction of the preform. In addition, some thermoplastics which chemically debond at high temperatures are also preferably avoided.

In other embodiments it is also possible to select an uncured thermoset resin, which may be, for example, a reactive resin comprising one or more components, which can be injected as a low viscosity liquid into the mold and then cured. Suitable thermosetting resins include epoxy resins, polyurethanes, vinyl ester resins, unsaturated polyesters, phenolic resins, mixtures thereof, and the like. Most preferred are the epoxy resins, vinyl ester resins, unsaturated polyesters and polyurethanes.

The most suitable epoxy resins are liquid at room temperature and are cured with a liquid reactant such as a polyamine. Suitable epoxy resins include those described in U.S. Pat. No. 4,810,444 and 4,863,994, incorporated herein by reference. Particularly suitable epoxy resins include polyglycidyl ethers of polyhydric phenols such as, for example, diglycidyl ethers of biphenol, bisphenols, hydrocarbyl substituted biphenol and bisphenols, phenol or hydrocarbyl substituted bisphenol-aldehyde novolac resins, unsaturated hydrocarbon-phenol or hydrocarbyl substituted phenol resins, combinations thereof, and the like. Most particularly suitable are glycidyl ethers of bisphenol A having an epoxide equivalent weight from about 350 to 2000, more preferably about 600 to about 1000. Suitable vinyl ester and polyesters include those described in U.S. Pat. No. 4,992,228. Suitable vinyl ester resins include, for example, the acrylate or methacrylates of polyglycidyl ethers of compounds having an average of more than one phenolic hydroxyl group per molecule. Most particularly suitable are the 500–2000 molecular weight reaction products of the glycidyl ether of bisphenol A and acrylic or methacrylic acid. Particular suitable unsaturated polyester resins include, for example, the reaction products of an unsaturated diacid, such as fumaric acid, with an alkoxylated bisphenol, such as a propoxylated or ethoxylated bisphenol A.

Preferred polyurethanes are reaction products of a polyisocyanate and an active hydrogen-containing composition. The preferred polyisocyanates are toluene diisocyanate ("TDI"), diphenylmethanediisocyanate ("MDI"), and derivatives of MDI such as polymeric MDI and prepolymers made from MDI. The active hydrogen-containing composition generally comprises one or more compounds having an average of two or more isocyanate-reactive groups per molecule and equivalent weights in the range from about 31 to about 3000. Preferably, a monofunctional material is also included in the active hydrogen-containing composition, as described in U.S. Pat. No. 4,663,994. The active hydrogen-containing composition may further contain additives such as catalysts, colorants, surfactants, blowing agents, combinations thereof, and the like.

The preform and binder can also be heated and pressed into a composite article without injecting another matrix resin. The binder in this situation can either be a thermoplastic resin which will cool and set or a thermoset resin which will cure and set. Extremely low density composite articles can be prepared in this manner.

The resulting composites are useful for a wide variety of uses, such as automobile bumpers, spare tire covers, computer housings, automobile headliners, and in other structural applications.

The following examples are provided merely to illustrate the invention and should not be interpreted as limiting it in any way. Unless stated otherwise, all parts and percentages are given by weight.

EXAMPLE 1

A glass fiber roving sold by Certainteed Corporation as Certainteed 227 roving is dispensed onto a 457 mm$^2$ screen having 3.2 mm diameter holes located on a 4.8 mm triangular pitch. The fibers are chopped into 32 mm lengths and blown onto the screen using a commercial chopper gun. A vacuum means located on the reverse side of the screen pulls air through the screen to hold the fibers in place.

Concurrently, a molten thermoplastic epoxy binder material is applied to the screen with the fibers. This resin is a diglycidyl ether of bisphenol A having a melting point (Tg) of 55–60° C. and an epoxide equivalent weight of 675–750. Its viscosity at 225° C. is 114 centipoise, and it is solid at 25° C. The resin is applied by first grinding it to a mesh size of 50–100 (U.S. Standard). The resulting particulate is placed into the reservoir of a UTP "Uni-Spray-Jet" 71000 flame-spray gun and sprayed though a propane/oxygen flame onto the fibers. The amount of binder is 74 g and the amount of resin is 983 g, with the binder being sprayed at a rate of 37.5 g/min and the resin being sprayed at a rate of 500 g/min for a binder /glass ratio of 0.075. The spray nozzles are located directly proximate to each other, equidistant from the screen at a distance of approximately 45.7 cm.

The flame spray heats the binder and fibers on the surface for a time period of approximately 0.8 sec, which is calculated based upon the rate of the robot's movement traversing the screen, which is approximately 400 mm/sec. Temperature of the binder and fibers peaks at a maximum temperature on the screen surface of approximately 225° C., as determined by thermocouples and a high speed data acquisition computer system.

The fibers of the preform are compacted by the force of the binder spray and also by the vacuum means located behind the screen, which is pulling air through the screen at a rate of 5 m/sec. As the heat source moves away from each given point on the preform, the binder quickly cools and appears to resolidify effectively immediately. The resulting preform has an overall volumetric fraction of fiber of 0.146, and an equivalent areal weight of 2.45 kg/m$^2$. The thickness of the preform is 6.53 mm.

Samples of the preform are checked to determine local binder and glass concentrations. It is found that the average coefficient of variation of the dispersion of the components is approximately 5 percent.

EXAMPLE 2 (COMPARATIVE)

Using the methodology described in Example 1 hereinabove, a similar preform is made. However, the nozzles are located at a spray distance of 111.8 cm from the screen. The screen surface is heated to only 95° C. and the binder's viscosity at that point is 210,000 centipoise. The resulting preform is 31 percent thicker than that of Example 1, at 8.54 mm, and its overall volumetric fraction of fiber is 0.111.

EXAMPLE 3

A formulated epoxy powder formulation consisting of a solid epoxy powder and a curing agent are processed to prepare a preform under the same conditions as in Example 1, except that the formulation has a hardener rate of 150 g/min, which is twice that of the formulation in Example 1. The epoxy partially cures as it is sprayed toward the screen. The resulting preform is then placed into a heated mold and pressed, without further impregnation, to cure the binder and produce a composite article.

EXAMPLE 4

A preform produced as shown in Example 3 is placed into a closed mold and a vinyl ester resin is injected into it to produce a composite article. The binder is allowed to cure into a thermoset material. Subsequent elevated temperature testing shows no binder migration to the surface as can occur with thermoplastic binders.

What is claimed is:

1. A method of making a fiber preform, suitable for use in preparing a composite article, comprising the steps of:
   (a) selecting a thermoplastic binder material which is particulate and solid at 25° C.;
   (b) concurrently depositing reinforcing fibers and the binder material onto one side of a foraminous screen having a vacuum means positioned on the opposite side thereof which maintains the fibers and binder material in position on the one side of the screen, wherein the binder material is heated and deposited by means of a flame spray device;
   wherein the binder material is heated sufficiently by the flame spray device such that its viscosity on the screen reaches a predetermined minimum level and after the viscosity of the binder material has reached the predetermined minimum level, the binder material is returned to a solid state within a time period in seconds equal to the predetermined minimum level of viscosity in centipoise times 1/1000.

2. The method of claim 1 wherein the binder material is a thermoplastic organic polymer and the fibers are glass, graphite, carbon or high flexural modulus organic polymer fibers.

3. The method of claim 1 wherein the binder material is a thermoplastic epoxy resin.

4. The method of claim 1 wherein the fibers have a diameter from about 1 to about 1000 microns.

5. The method of claim 1 wherein the binder material is employed in an amount of from about 1 to about 20 parts by weight of binder material to about 100 parts by weight of fibers.

6. A method for making a fiber preform, suitable for use in preparing a composite article, comprising the steps of:

(a) selecting a thermoplastic binder material which is particulate and solid at 25° C.;

(b) concurrently depositing reinforcing fibers and the binder material onto one side of a foraminous screen having vacuum means positioned on the opposite side thereof which maintains the fibers and binder material in position on the one side of the screen, wherein the binder material is heated and deposited by means of a flame spray device;

wherein (i) the binder material is heated sufficiently by the flame spray device such that its viscosity on the screen reaches a predetermined minimum level of less than about 1,000 centipoise, and (ii) after the viscosity of the binder material has reached the predetermined minimum level, the binder material is returned to its solid state in about t seconds wherein t equals the predetermined minimum level of viscosity in centipoise times 1/1000.

7. A method for making a fiber preform, suitable for use in preparing a composite article, comprising the steps of:

(a) selecting a thermoplastic binder material which is particulate and solid at 25° C.;

(b) concurrently depositing reinforcing fibers and the binder material onto one side of a foraminous screen having a vacuum means positioned on the opposite side thereof which maintains the fibers and binder material in position on the one side of the screen, wherein the binder material is heated and deposited by means of a flame spray device;

wherein (i) the binder material is heated sufficiently by the flame spray device such that its viscosity on the screen is a predetermined minimum level of from 1,000–2,000 centipoise, and (ii) after the viscosity of the binder material has reached the predetermined minimum level, the binder material is returned to its solid state in about t seconds wherein t equals the predetermined minimum level of viscosity in centipoise times 1/1000.

8. A method of comprising the steps of:

(a) selecting a thermoplastic binder material which is particulate and solid at 25° C.;

(b) concurrently depositing reinforcing fibers and the binder material onto one side of a foraminous screen having a vacuum means positioned on the opposite side thereof which maintains the fibers and binder material in position on the one side of the screen, wherein the binder material is heated and deposited by means of a flame spray device;

wherein the binder material is heated sufficiently by the flame spray device such that its viscosity on the screen reaches a predetermined minimum level and after the viscosity of the binder material has reached the predetermined minimum level, the binder material is returned to a solid state within a time period in seconds equal to the predetermined minimum level of viscosity in centipoise times 1/1000 to thereby form a preform; and (c) impregnating the preform with a resin which is reactive or non-reactive with the binder material.

9. A method of making a composite article, comprising the steps of:

(a) selecting a thermoplastic binder material which is particulate and solid at 25° C.;

(b) concurrently depositing reinforcing fibers and the binder material onto one side of a foraminous screen having a vacuum means positioned on the opposite side thereof which maintains the fibers and binder material in position on the one side of the screen, wherein the binder material is heated and deposited by means of a flame spray device;

wherein the binder material is heated sufficiently by the flame spray device such that its viscosity on the screen reaches a predetermined minimum level and after the viscosity of the binder material has reached the predetermined minimum level, the binder material is returned to its solid state within a time period in seconds equal to the predetermined minimum level of viscosity in centipoise times 1/1000 to thereby form a preform; and (c) heating and pressing the preform to form a composite article.

* * * * *